July 6, 1965 R. A. MUNSE 3,192,823
CAGE NUT ASSEMBLY WITH A PIVOTAL NUT
Filed April 19, 1963
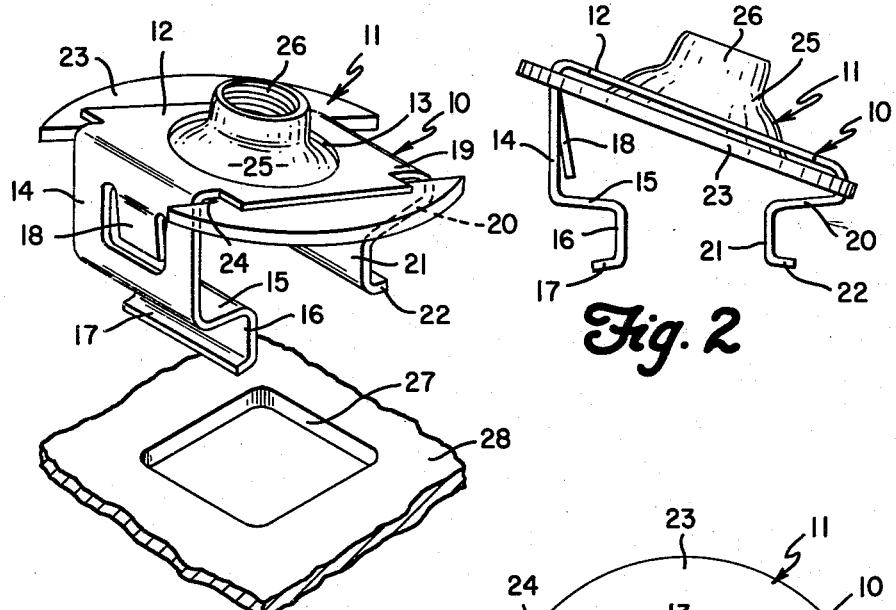
Fig. 2
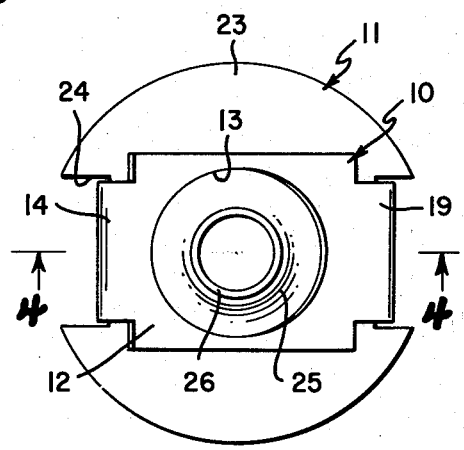
Fig. 3
Fig. 1
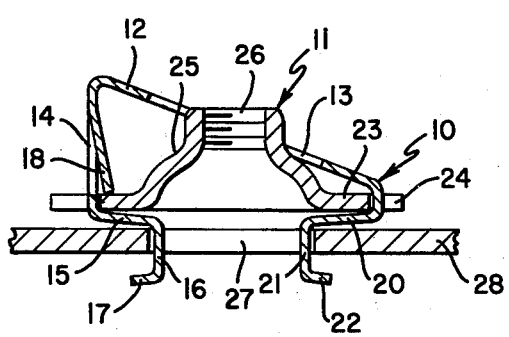
Fig. 4
INVENTOR.
ROBERT A. MUNSE
BY Malcolm W. Fraser
ATTORNEY

United States Patent Office 3,192,823
Patented July 6, 1965

3,192,823
CAGE NUT ASSEMBLY WITH A PIVOTAL NUT
Robert A. Munse, Perrysburg, Ohio, assignor, by mesne assignments, to The Bishop and Babcock Corporation, Toledo, Ohio, a corporation of Ohio
Filed Apr. 19, 1963, Ser. No. 274,117
3 Claims. (Cl. 85—80)

This invention relates to cage nut assemblies particularly of the type for application to a supporting panel aperture.

An object is to produce a cage nut assembly, the cage having a pair of oppositely facing hook elements for successive engagement with opposite edge portions of a panel aperture, one hook element being relatively rigid and the other being flexible resiliently, and the nut member of which can rock or pivot to a position affording relatively free movement of the flexible hook element or to a position in which movement of the flexible hook element toward the rigid hook element is blocked.

Another object is to produce a cage nut assembly of the above character in which a detent is employed for positively holding the nut member in the hook element blocking position.

A further object is to produce a cage nut assembly having a cage or retainer and a nut member in which the nut member is mounted for pivotal or rocking movements to enable relatively free application of the assembly to a panel aperture when in one position or to prevent disengagement therefrom when in another position.

Other objects and advantages of the invention will hereinafter appear and, for purposes of illustration but not of limitation, an embodiment of the invention is shown on the accompanying drawings, in which FIGURE 1 is a top perspective view of the cage nut assembly and also showing in perpsective a fragment of a supporting panel with a hole for receiving the assembly;

FIGURE 2 is a side edge elevation of the cage nut asesmbly with the nut element in its inclined raised position, such as to enable relatively free flexure of one of the engaging hooks so as to facilitate application of the asesmbly in a panel aperture;

FIGURE 3 is a top plan view of the cage nut assembly; and

FIGURE 4 is a vertical sectional view of the cage nut assembly taken on the line 4—4, FIGURE 3, and showing the nut member in its lowered position blocking flexing movement of the hook elements toward each other and thereby securing the assembly in a panel aperture.

The illustrated embodiment of the invention comprises a cage nut assembly which on the drawings is shown greatly enlarged, the actual fastener being one-half the size of that illustrated, or even smaller. The assembly comprises a cage or retainer member 10 and a separate nut member 11 which is contained by the cage member.

The retainer member 10 comprises a one-piece spring sheet metal structure having a rectangular susbtantially flat body or base 12 formed with a central hole 13. At one side of the base 12 is a downwardly and inwardly inclined arm 14 which forms with the body 12 an angle somewhat less than 90°. The arm 14 is of appreciable length and is somewhat narrower than that of the body 12. Extending inwardly at approximately right angles from the lower edge of the arm 14 is an arm portion 15 which has a depending vertical hook arm portion 16 disposed at approximately right angles to the arm 15. The hook arm portion 16 terminates in an outwardly extending inclined lip 17. It will thus be understood that the arm portions 15 and 16 and the lip 17 cooperate to form a hook for hooking engagement with the edge portion of a panel aperture, such as indicated at 27, on the supporting panel 28.

On the side of the retainer base 12 opposite to that of the arm 14, is a tab 19 of the same width as that of the arm 14. The tab 19 is bent inwardly upon itself to form a contiguous arm portion 20 similar to the arm portion 15 and arranged directly opposite thereto. Extending generally at right angles to the arm portion 20 is a depending hook arm portion 21 of the same length as the arm portion 16 and approximately parallel thereto. The arm portion 21 terminates in an outwardly inclined lip 22. It will be recognized that the arm portions 20 and 21 and the lip 22 cooperate to form a hook for engaging an edge portion of a panel aperture, such as 27, opposite to that engaged by the hook arm 16.

The nut member 11 which is contained by the cage or retainer member 10 has a flat generally arcuate sheet metal body or base 23 which is arranged directly beneath the retainer body 12. At opposite sides of the base 23 are notches 24 to fit the arm 14 and tab 19 relatively closely but with sufficient clearance to afford rocking or pivotal movement as will hereinafter appear. Formed approximately centrally of the base 23 is an upward extrusion 25 terminating in an internally screw threaded nut element 26. As shown the extrusion 25 is adapted to project through the hole 13 in the retainer base 12.

The nut body or base 23 is adapted to rock or tilt about the bend of the tab 19 as a pivot from or between an upper inclined position substantially parallel to the retainer base 12 as shown in FIGURES 1 and 2 and a horizontally disposed lower position in which the under side of the nut base 23 is juxtaposed to or adapted to rest upon the arms 20 and 15.

In the lower or horizontal position of the nut base 23, as shown in FIGURE 4, a struck out spring tongue or latching detent 18 on the arm 14 and which is normally inwardly inclined with the free end disposed downwardly, is adapted to engage the upper face of the adjacent portion of the nut base 23 as shown in FIGURE 4. In this position the nut member is latched in its position of use and with the nut element 26 axially aligned with the hole 27 in the supporting panel 28 to which the assembly is applied.

It will be understood that when the nut member 11 is in its raised position, as shown on FIGURES 1 and 2, the arm 14 can flex freely and readily toward and away from the hook arm 21. In this position the retainer member 10 can be readily applied to the panel aperture 27, by first hooking the hook 21 against one side of the aperture 27, and then, by inwardly flexing the arm 14, the hook member 16 can be easily inserted into the aperture 27 and upon being released will snap into engagement with the opposite edge portion of the hole 27. After the assembly has been applied to the supporting panel, the nut base 23 is rocked from the position shown in FIGURES 1 and 2 to that of FIGURE 4, at which time the nut base 23 flexes the tongue 18 outwardly to admit passage of the nut base and to a position directly beneath the free end of the tongue.

The tongue then snaps inwardly to the position shown on FIGURE 4 above the nut base 23 holding it from upward movement.

Manifestly, when the nut base is in this position movement of the hook elements toward each other is blocked so that the assembly is retained in its applied position to the supporting panel and the structure is such as to resist separation of the assembly from the supporting panel when forces are applied in a manner which would simulate abuse of the part in assembly. It will be apparent that the assembly can be applied very easily with only slight finger pressure against the arm 14 and by means of the latching tongue 18 the fastener is secured firmly into the panel aperture making removal exceedingly difficult. However, removal can be effected by employing a tool outwardly to flex the arm 18 and release the retainer base so that it can be rocked upwardly to the position shown on FIGURES 1 and 2.

Numerous changes may be effected in details of construction, arrangement and operation without departing from the spirit of the invention especially as defined in the appended claims.

What I claim is:

1. A cage nut assembly comprising a unitary spring metal retainer having a centrally apertured flat inclined base, a depending arm of appreciable length at one side of said base terminating in an outwardly facing hook element for engaging the edge of a panel aperture, an inwardly extending latching tongue on said arm with the free end thereof juxtaposed to said hook element, a short tab on the opposite side of said base provided with an inward bend contiguous with said base and terminating in an outwardly facing hook element generally aligned with said first hook element, and a nut member of substantially rigid material fitting said retainer and rockable about said inward bend as a pivot so as to lie in a raised inclined position or a lower horizontal position disposed beneath and captured by said latching tongue, whereby with said nut member in its raised inclined position said arm can freely flex to enable the hook element carried thereby to be rocked toward the other hook element for facilitating the application of the retainer to a panel aperture and with said nut member in its lowered horizontal position said latching tongue retains the same and flexure of said hook elements toward each other is prevented.

2. A cage nut assembly as claimed in claim 1 in which said nut member comprises a flat base and a screw threaded nut coaxial with the aperture in the retainer base.

3. A cage nut assembly as claimed in claim 1 in which said nut member comprises a flat sheet metal base notched to fit the arm and tab portions of the retainer and an extruded internally screw threaded nut projecting through the aperture in the retainer base.

References Cited by the Examiner

UNITED STATES PATENTS

| 1,623,789 | 4/27 | Hubener | 151—41.75 |
| 1,800,176 | 4/31 | Carr | 151—41.75 |
| 2,737,269 | 3/56 | Flora. | |
| 2,875,804 | 3/59 | Flora | 151—41.75 |
| 3,060,988 | 10/62 | Munse | 151—41.75 |

FOREIGN PATENTS

| 563,746 | 9/58 | Canada. |

EDWARD C. ALLEN, *Primary Examiner.*